US008660369B2

(12) United States Patent
Llano et al.

(10) Patent No.: US 8,660,369 B2
(45) Date of Patent: Feb. 25, 2014

(54) SYSTEMS AND METHODS USING MOBILE DEVICES FOR AUGMENTED REALITY

(75) Inventors: Federico Martin Llano, Burbank, CA (US); Marvin S. White, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 597 days.

(21) Appl. No.: 12/911,222

(22) Filed: Oct. 25, 2010

(65) Prior Publication Data

US 2012/0099800 A1   Apr. 26, 2012

(51) Int. Cl.
*G06K 9/62* (2006.01)
*G06K 9/54* (2006.01)

(52) U.S. Cl.
USPC .......................................... 382/224; 382/305

(58) Field of Classification Search
USPC .................... 382/224, 225, 228, 305
See application file for complete search history.

(56) References Cited

U.S. PATENT DOCUMENTS

| 7,643,686 B2 * | 1/2010 | Kraus et al. | 382/225 |
| 7,653,249 B2 * | 1/2010 | Loui et al. | 382/224 |
| 8,422,794 B2 * | 4/2013 | Ptucha et al. | 382/209 |
| 2007/0162942 A1 | 7/2007 | Hamynen et al. | |
| 2009/0049004 A1 | 2/2009 | Nurminen et al. | |
| 2009/0316951 A1 | 12/2009 | Soderstrom | |

OTHER PUBLICATIONS

Takacs G. et al., "Outdoors Augmented Reality on Mobile Phone Using Loxel-based Visual Feature Organization", Proceedings of the Workshop on Multimedia Information Retrieval(MIRO), XX Vancouver, B.C., Canada, Oct. 27, 2008, XP007915264, DOI: 10.1145/1460096.1460165, ISBN: 097-1-60558-312-9, (pp. 427-434, 8 pages total).
"European Search Report", dated Jan. 12, 2012, for European Application No. 11185436.0-1225, 9pgs.
European Patent Office, "Communication pursuant to Article 94(3) EPC", (Mar. 18, 2013), for European Application No. 11185436.0-1951, 4pgs.

* cited by examiner

*Primary Examiner* — Yon Couso
(74) *Attorney, Agent, or Firm* — Buckley, Maschoff & Talwalkar LLC (57) ABSTRACT

Systems, methods, apparatus, means and computer program code for operating a mobile device are provided which includes program instructions for detecting a capture of an image, instructions for detecting a location and a time associated with said capture of said image, instructions for transmitting, to a processing system, a request for information associated with said image, said request including information identifying said location and said time, and instructions for receiving a response from said processing system, said response including information associated with said image.

18 Claims, 5 Drawing Sheets

SYSTEMS AND METHODS USING MOBILE DEVICES FOR AUGMENTED REALITY

FIELD

Embodiments relate to mobile devices. More particularly, embodiments relate to the use of mobile devices to augment a view of a location with additional information.

BACKGROUND

Viewers of events, such as sporting events, are interested in knowing statistics and information associated with the event. When a sporting event is viewed on television, statistics, scores, and other information are presented to the viewer as an overlay on the video stream of the game. Other graphical techniques are also used to enhance the information presented to viewers, including first down yard lines in football games, or the like. It would be desirable to provide similar content, statistics and information to viewers of live events.

DETAILED DESCRIPTION

Embodiments of the present invention relate to systems and methods for providing additional or enhanced information about an event or location using a mobile device.

In some embodiments, mobile devices, such as smart phones, tablet computers, or other portable communication and computing devices, are provided with software (referred to herein as "applications" or "mobile applications") that allow users to obtain additional or enhanced information about an event or location using a mobile device. Some embodiments allow users to obtain news, scores, graphics and other information associated with an event or a location by using an image capture device to capture a view of the event or location. The additional or enhanced information may then be provided to the user as a graphical or text overlay on a display of the mobile device. In some embodiments, a user may enjoy enhanced information such as scores, statistics, specific local features, and other information on a display device of their mobile device.

To illustrate features of some embodiments, an exemplary (but not limiting) example will be provided and referenced throughout this disclosure. In the illustrative example, a user of a mobile device configured to operate pursuant to the present invention is attending a professional football game. During the game, the user occasionally wishes to get game updates or statistics that may not be otherwise easily obtained at the stadium. For example, the user may wish to see an image of where the first down marker is (similar to the 1$^{st}$ and ten graphic shown on some televised football games), or to find a player's statistics. The user may also wish to find the location of a favorite food stand in the stadium, or the nearest restroom. The user may further wish to locate a friend who is also attending the game and who is also operating a mobile device configured pursuant to the present invention. Embodiments of the present invention, as will be described further below, allow some or all of these scenarios to occur. Those skilled in the art, upon reading this disclosure, will recognize that similar techniques may be used in conjunction with other events or locations to provide a user with access to additional data and information about the event or location.

Figure 1:
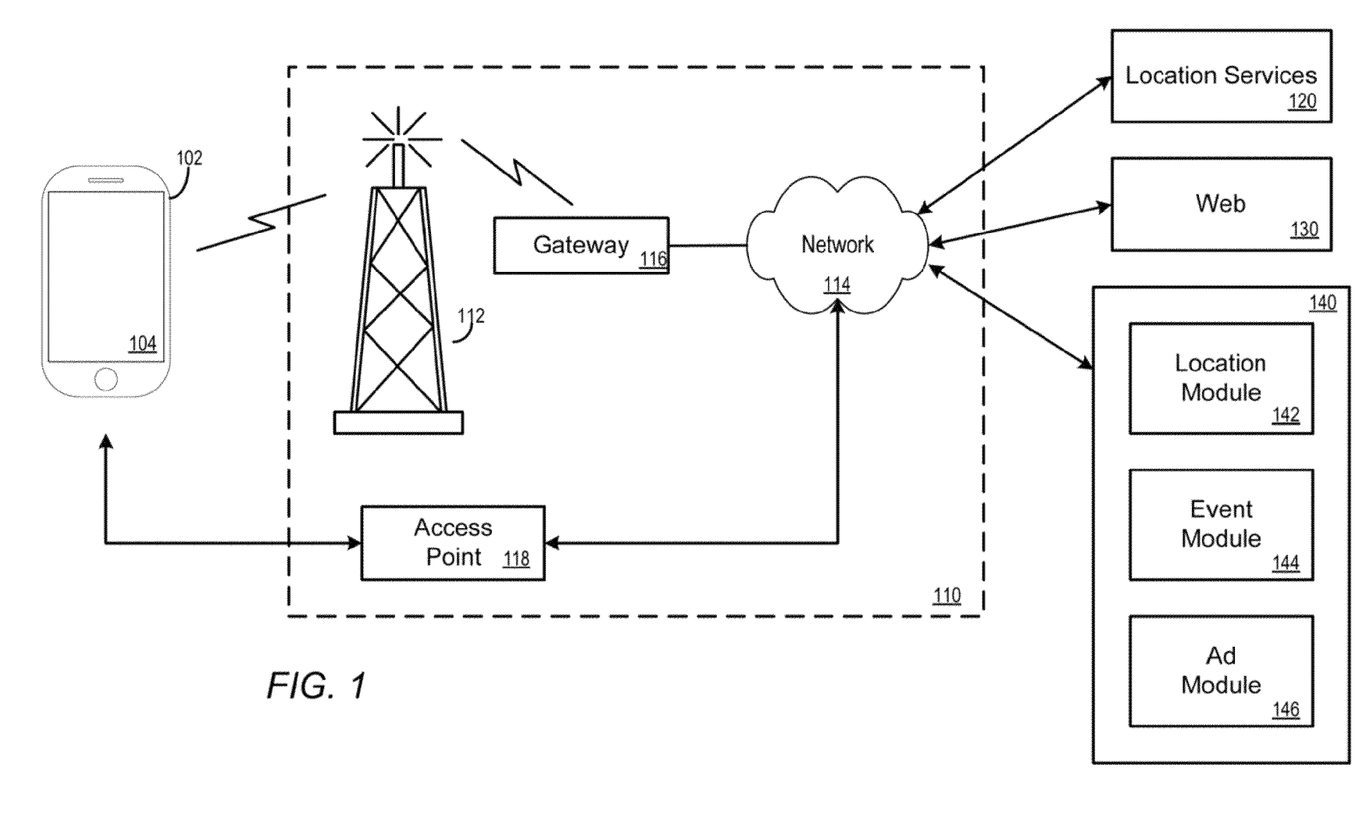
FIG. 1 illustrates a system architecture within which some embodiments may be implemented.

Features of some embodiments will now be described by reference to FIG. 1, which is a block diagram of a mobile information system 100 pursuant to some embodiments. As shown in FIG. 1, a system 100 includes a mobile device 102 in communication with a content engine 140 via a network 110. The mobile device 102 may be a device operated by an individual registered or authorized to receive information from content engine 140. While only a single mobile device 102 is shown in FIG. 1, a number of mobile devices 102 may interact with and access information from one or more content engines 140 via one or more networks 110. Further, pursuant to some embodiments, individual mobile devices 102 may interact with each other (either directly or through content engine 140) to allow users to locate and interact with each other. Some or all of the functionality allowing mobile device 102 to interact with content engine 140 may be provided using a mobile application installed on mobile device 102 as described further herein. Examples of various types of data that may be provided to a mobile device 102 associated with a location or an event are shown below in conjunction with FIGS. 2-3, although other implementations and examples will be apparent to those skilled in the art upon reading this disclosure.

The mobile device 102 may be, for example, a mobile telephone, PDA, personal computer, or the like. For example, the mobile device 102 may be an iPhone® from Apple, Inc., a BlackBerry® from RIM, a mobile phone using the Google Android® operating system, a portable or tablet computer (such as the iPad® from Apple, Inc.), or the like. Pursuant to some embodiments, the mobile device 102 may be operated to transmit information about a location or an event to a remote content engine 140, and receive information associated with the location or event from the content engine 140. For example, the data transmitted from the mobile device 102 may include geolocation data as well as image data for use by the content engine 140 in identifying and transmitting information that may be useful in augmenting a user's view of the location or event. In the illustrative example introduced above, the mobile device 102 may be operated by a user who is attending a football game. Information transmitted to the content engine 140 may include a geocoded location of the mobile device 102 indicating that the user is at a particular football stadium at a particular time.

The mobile device 102 may also transmit one or more images captured by the user associated with the user's view of the football game (e.g., such as an image of the field, an image of a portion of the field, an image of a player, or an image of a particular seat in the stadium). The image(s) may be used by the content engine 140 to retrieve and return additional information that may be of interest to the user (e.g., such as statistics, scores, or the like as will be described further below). In this manner, a user operating a mobile device 102 may receive targeted and relevant information associated with a live event or a location, enhancing the user's experience of the event or location.

Pursuant to some embodiments, the mobile device 102 is capable of capturing and transmitting geolocation data as well as image data. In some embodiments images captured by the mobile device 102 may be tagged or appended with meta data identifying the location as well as a time/date stamp. In some embodiments, the mobile device 102 appends or transmits information identifying the user. The information transmitted from the mobile device 102 is transmitted to one or more remote devices or systems such as content engine 140 over a network 110. In some embodiments, the mobile device 102 may perform some image recognition processing to facilitate content identification by the content engine 140. For example, in the illustrative example, the user at the football game may point a camera of the mobile device 102 at the football field. Image recognition software in the mobile device 140 may operate on the image to identify the yard markers and out of bound markers on the field and may tag those markers in the image. The content engine 140 may then provide meta data which allows graphic overlays (such as first and ten or red zone images) to be overlaid on a display screen of the mobile device 102.

FIG. 1 shows several communication paths between the mobile device 102 and the content engine 140 (as well as other devices and data sources). The mobile device 102 can, for example, communicate over one or more wired and/or wireless networks 110. As an example, a wireless network can be a cellular network (represented by a cell transmitter 112). A mobile device 102 may communicate over a cellular or other wireless network and through a gateway 116 may then communicate with a network 114 (e.g., such as the Internet or other public or private network). An access point, such as access point 118 may be provided to facilitate data and other communication access to network 114. The access point 118 may be, for example, compliant with the 802.11g (or other) communication standards.

In some embodiments, mobile device 102 may engage in both voice and data communications over the wireless network 110 via access point 118. For example, the mobile device 102 may be able to place or receive phone calls, send and receive emails, send and receive short message service ("SMS") messages, send and receive email messages, access electronic documents, send and receive streaming media, or the like, over the wireless network through the access point 118. Similar communications may be made via the network 112. Multiple mobile devices 102 may communicate with each other either directly via the cell network or through the network 114 based on interactions with the content engine 140 or other services.

In some embodiments, a mobile device 102 may also establish communication by other means, such as, for example, wired connections with networks, peer-to-peer communication with other devices (e.g., using Bluetooth networking or the like), etc.

The mobile device 102 can, for example, communicate with one or more services over the networks 110, such as location service provider 120, Web services providers 130, and content engine 140. For example, the mobile device 102 may communicate with one or more location services 120 to obtain geocoded location data associated with a location of the mobile device 102 and/or a location of an event or activity associated with an image captured by the mobile device 102. The location services 120 may also retrieve or identify additional information associated with a location (e.g., such as a map or location information associated with data or images from the mobile device 102). As a specific example, continuing the illustrative example introduced above, the location services 120 may provide stadium or field information associated with the football game attended by the user. In some embodiments, the content engine 140 may identify or retrieve information from a location module 142 using the geocoded location data received from the mobile device 102 in order to provide enhanced location data to the user. The content engine 140 may further identify or retrieve event information from an event module 144 using the geocoded location data and time stamp information received from the mobile device in order to provide enhanced event or statistical information to the user. Further, the content engine 140 may transmit targeted advertisements to the mobile device 102 based on information received from the mobile device 102 and/or information retrieved using the location module 142 or event module 144.

For example, continuing the illustrative example introduced above, the football fan who is attending a football game may point the camera of his mobile phone at the field during a play. The mobile phone will transmit the image as well as a timestamp and geolocation data to the content engine 140 which then uses the information to retrieve information about the specific game and play that occurred when the mobile device captured the image. The content engine 140 may do this by first determining the location of the image (and by consulting with data stored at or accessible to the location module 142). Based on the geocode information, it may determine that the image was taken at a specific football stadium. Based on the timestamp and/or information from the image captured, the content engine 140 may determine the specific play or status of the game at the moment that the image was taken (e.g., by consulting real time statistics from the event module 144). The content engine may then return a play-by-play recap of the game at the moment in time that the image was captured. In this manner, a football fan who is viewing the game live and in person may have the ability to replay aspects of the game or view specific information about the game that he may otherwise have missed while viewing the game live. In some embodiments, the content engine 140 may return images, text, video, or audio information to the mobile device 102 for presentation or display to the user.

The mobile device 102 can also access other data over the one or more wired and/or wireless networks 110. For example, content providers, such as news sites, RSS feeds, web sites, blogs, social networking sites, developer networks, etc., can be accessed by the mobile device 102. Such access can be provided by invocation of a web browsing function or application (e.g., a browser) in response to a user launching a Web browser application installed on the mobile device 102.

The mobile device 102 may operate as a telephone, an email device, a network communication device, a media player device, etc., under control of one or more applications installed on the mobile device 102. In some embodiments, a user operating the mobile device 102 may interact with the applications using a touch screen keypad on a display screen 104 of the device 102. A tactile keypad may also be used. The user is presented with information and graphics on the display screen 104. Examples of screens and information that may be presented to a user will be shown and discussed below in conjunction with FIGS. 2 and 3 (although those skilled in the art, upon reading this disclosure, will appreciate that the example screens are illustrative and not limiting and that a wide variety of different displays and presentations of data or information may be used).

In some embodiments, the content engine 140 and other services may be operated or maintained by broadcasters or information service providers. In some embodiments, those entities may also distribute or provide a mobile application that is installed on mobile device 102 to allow interaction and functions as described herein. Pursuant to some embodiments, the mobile application may be stored in, or accessible to, a memory of mobile device 102 which allows a user of the mobile device to obtain the additional data or information provided by the present invention.

Those skilled in the art, upon reading this disclosure, will appreciate that embodiments of the present invention may be used in conjunction with a number of different types of events or locations. For example, embodiments of the present invention allow users to operate mobile devices to obtain enhanced or additional information about different events (such as live football, baseball, soccer, golf, races or other events) and locations.

Pursuant to some embodiments, a user of a mobile device 102 may launch a mobile application stored on the device 102 to obtain additional information about an event or location. The mobile application may prompt the user to select the type of information requested (such as a selection of game or event information, location information, or the like) or it may simply return a standard set of information (e.g., such as a score or statistics, etc.).

Figure 5:
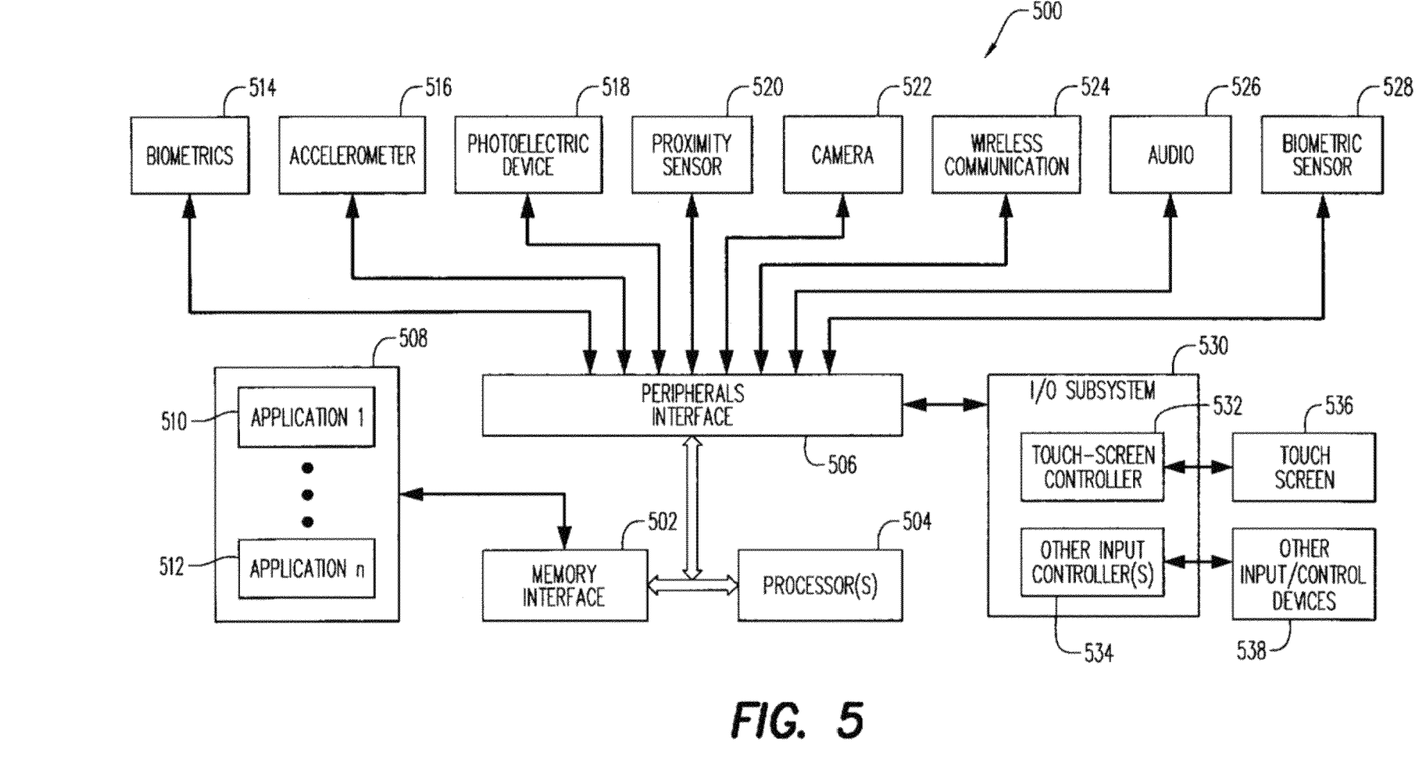
FIG. 5 is a block diagram of a mobile device pursuant to some embodiments.

Features of mobile devices 102 will be described further below in conjunction with FIG. 5. Preferably, in some embodiments, mobile device 102 is capable of communicating with remote systems (such as content engine 140) via wireless communication techniques, and is further capable of receiving as well as capturing information associated with an event or location for which additional information is desired. In some embodiments, the information may be captured using a camera or other image capture device, while in some embodiments, sensors (such as RFID sensors) may be used. In some embodiments, information identifying an event or location for which additional information is sought may include data that is key-entered by a user of the mobile device 102 (e.g., such as a request for specific statistics about a game, a player, or a location, etc.). Pursuant to some embodiments, information identifying an activity may be automatically captured by one or more sensors or components of the mobile device 102 and transmitted to the content engine 140 for use in identifying additional information associated with an event or location.

Figure 2:
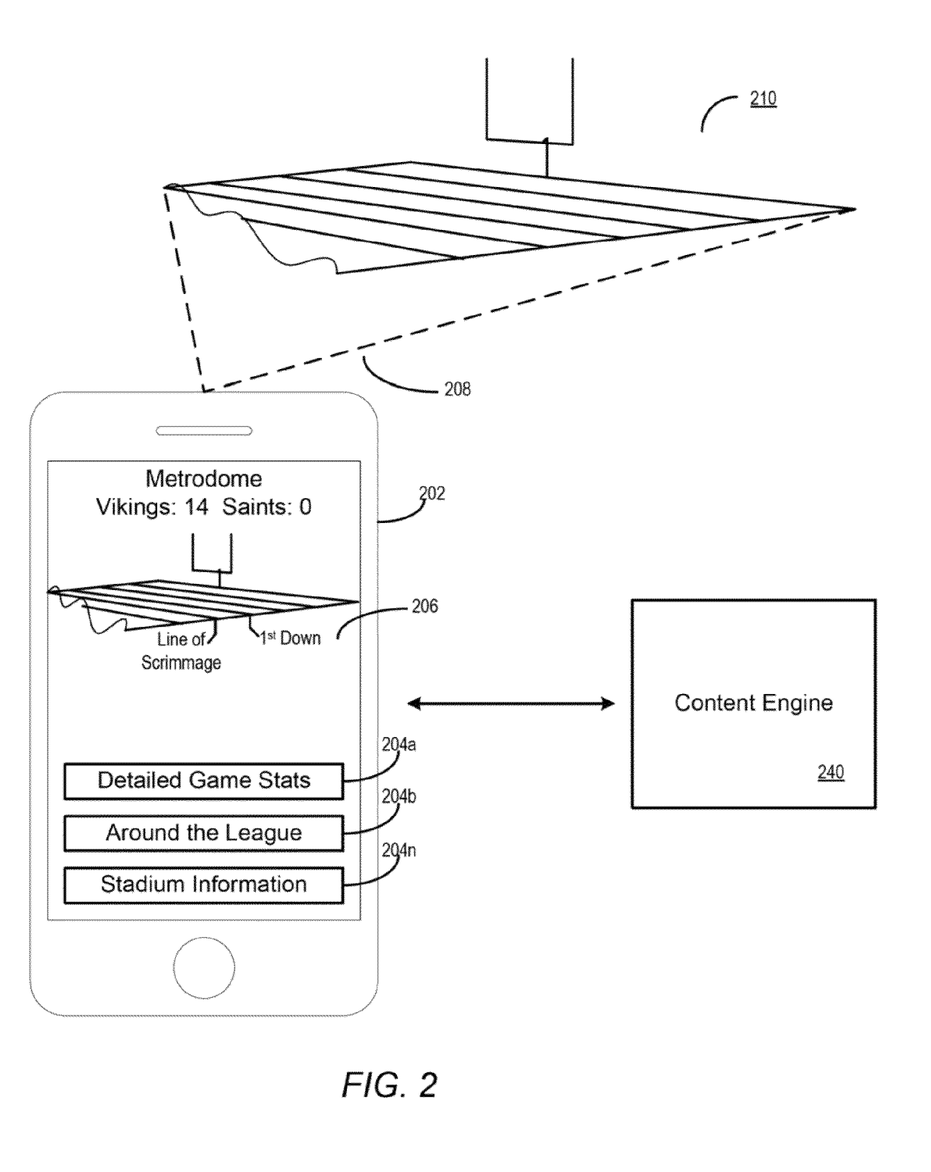
FIG. 2 illustrates an example usage of a mobile system pursuant to some embodiments.

Reference is now made to FIG. 2 which is a block diagram depicting a mobile device 202 in communication with a remote content engine 240 (e.g., over a network such as the network of FIG. 1, but which is not shown in FIG. 2). In the block diagram of FIG. 2, a user (not shown) is attending a football game at a football stadium. The user, interacting with mobile device 202, captures an image of a portion of the field 210 using an image capture device of the mobile device 202 (such as a camera or video recorder). Pursuant to some embodiments, a mobile application installed on the mobile device 202 operates to automatically (or, in some embodiments, based on input or control of a user) capture the image and operate on the image to identify information associated with an event occurring at the location. For example, pursuant to some embodiments, geocode data associated with the location of the mobile device 202 at the time of image capture are used by the content engine 240 to identify the field as a particular field (in the example, the field is the home stadium of the Minnesota Vikings). Other information is used to identify the current event occurring at the location. For example, using the location data as well as the time stamp received from the mobile device 202, the content engine 240 may determine that the current game at the stadium is a game between the Vikings and the Saints. Further, the score as of the time of the time stamp is 14-0. In some embodiments, once an initial image capture is performed at a location, a session may be established between the mobile device 202 and the content engine 240 to ensure that ongoing coverage of the event in progress is pushed to the mobile device 202. For example, in some embodiments, the initial image capture serves to trigger or initiate a session so that information about an ongoing event may be obtained without need to search or perform interactions with buttons or menus of the mobile device 202.

Pursuant to some embodiments, additional information, graphics and details may be obtained. As shown, the portion of the field 210 captured by the image capture device is a portion of the field near one of the end zones. The image is displayed on display device 206 along with additional information overlaid on top of the image of the field, including information about the current field position, the line of scrimmage and the first down marker. In some embodiments, the mobile application installed and operating on mobile device 202 is configured to perform certain image recognition functions, such as determining characteristics of events and locations. In the example of a football field, the application may be configured to detect line markers, first down markers, end zones, and the like. When an image of a portion of the field is captured by the mobile device 202, the application may perform image processing to identify those items. In some embodiments, the identification may be assisted by (or performed entirely by) the content engine 240. Once items or characteristics of the field or image are identified, data associated with those items may be displayed as an overlay or graphic to enhance the information presented to the user. For example, in the image of FIG. 2, a line of scrimmage identifier or graphic may be overlaid or presented on the display device 206. Similarly, a first down marker or line may be overlaid or presented on the display device 206, as well as score information, additional statistics or the like.

In this manner, users of mobile devices may enjoy accurate and relevant information about an event or a location to enhance their experience. In some embodiments, other options and data may be available to a user at an event or a location. As shown in FIG. 2, a number of icons or buttons 203a-n may be provided to allow the user to select other types of information. As shown, the user is able to select from among detailed game stats 204a, stats from around the league 204b and stadium information 204n. Those skilled in the art will appreciate that these are merely illustrative examples and that other options or choices may be provided.

Figure 3:
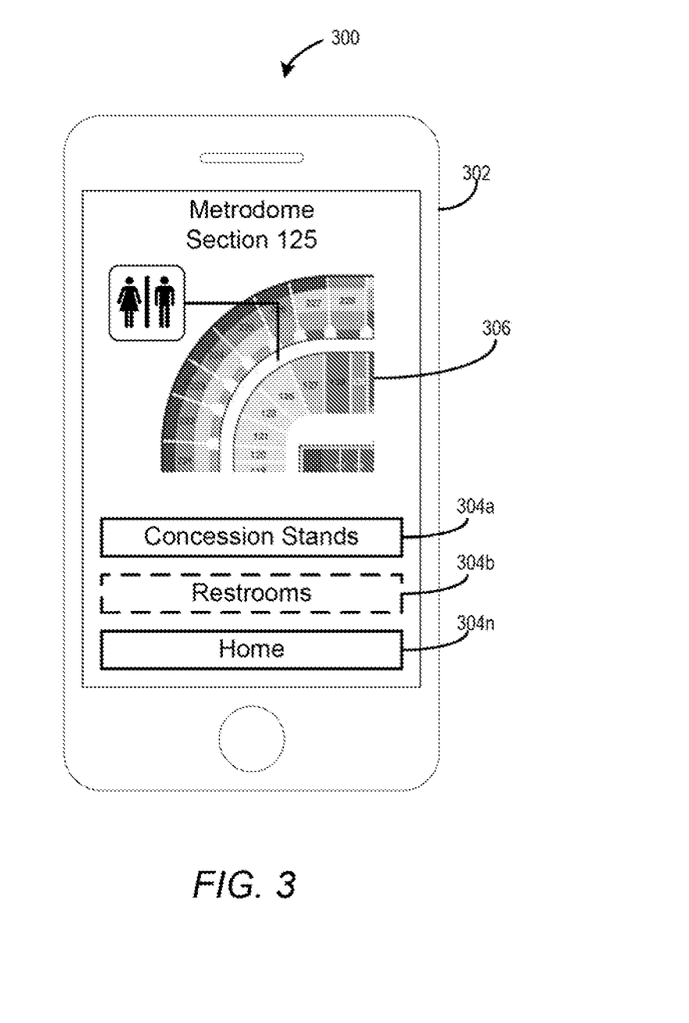
FIG. 3 is a block diagram illustrating a user interface pursuant to some embodiments.

Each of the options 204a-n may cause location and time and other information to be transmitted to the content engine 240 so that they may be used to obtain the additional or enhanced data. For example, if the user selects the option to obtain stadium information 204n, a map or seating chart of the stadium or venue where the user is currently located may be retrieved from the content engine 240. An illustrative display is shown in FIG. 3, where a mobile device 302 is shown displaying a seating chart 306 of the stadium where the user is currently located. Pursuant to some embodiments, the seating chart 306 may be positioned to show where the user is sitting (which may be approximate based on geocode information, or based on the actual seat number entered by the user or scanned using the camera of the mobile device 302). The user may be prompted to select from one or more options to display additional information, such as an overlay of where concession stands are located, where the nearest restrooms are, or the like.

Those skilled in the art will appreciate that the example user interfaces of FIGS. 2 and 3 are for illustrative purposes only. Features of the present invention may be desirably used in other types of locations or events. For example, embodiments may be used at other sporting events, such as soccer, golf, baseball or the like to identify features of events using image technology. In an embodiment used at a golf tournament, for example, a user may capture an image of a specific green on the course, and the content engine 240 may identify the course and the green, and return an interactive or detailed view of the green including prominent features (such as the pin position, distance of a ball to the pin, a cross sectional or elevation view of the green, etc). The result is a system and method that allows mobile device users to enjoy information that otherwise would not be available to them during live events or at locations.

Mobile device 202, pursuant to some embodiments, stores a mobile application program that may be loaded onto the mobile device 202 from a media, broadcasting or other entity (such as the entity operating content engine 240) or from an application repository (e.g., such as Apple's App Store or the like). The application, when launched allows the user to capture images associated with an event or location, and have those images processed by the application or by content engine 240 to identify features of the image as well as to obtain additional information about the event or location.

As discussed above in conjunction with FIG. 1, the content engine 140 may be comprised of a number of modules which process data and access and utilize additional data. As used herein, a "module" may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

As used herein, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In addition, entire modules, or portions thereof, may also be implemented in programmable hardware devices such as field programmable gate arrays, programmable array logic, programmable logic devices or the like or as hardwired integrated circuits.

Figure 4:
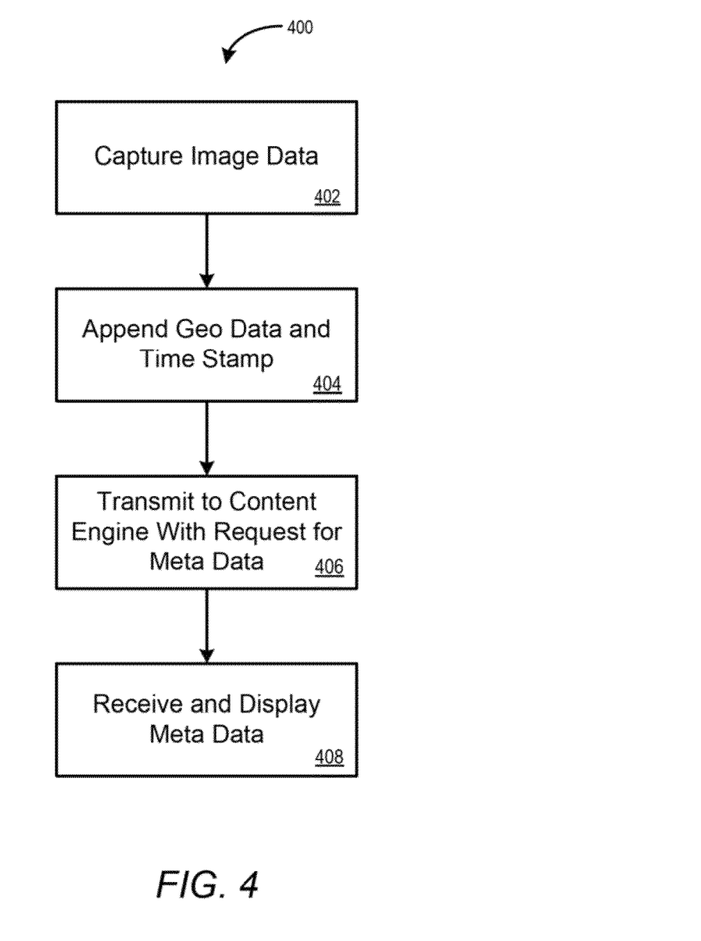
FIG. 4 is a flow diagram depicting a process pursuant to some embodiments.

Reference is now made to FIG. 4 which is a flow diagram depicting a process 400 for operating a mobile application pursuant to some embodiments. Some or all of the steps of process 400 may be performed using a mobile device such as the mobile device 102 of FIG. 1 (or the mobile device 500 described in further detail below in conjunction with FIG. 5).

In the process 400, a user of a mobile device 102 is at a live event, activity or location and wishes to obtain additional information about the event, location or activity. Prior to processing of the steps of FIG. 4, a user operating a mobile device 102 is presumed to have installed and (if necessary) configured a mobile application pursuant to the present invention. The mobile application may be installed from the mobile device (e.g., by interacting with an application download system), or from a personal computer in communication with the mobile device. The application may be downloaded from an application marketplace (such as the iTunes® Store or Android® Store). Further, in some embodiments, prior to processing at 402, the user is presumed to have performed any configuration or personalization of the mobile application. For example, the user may have entered information about themselves, their preferences, or the like. The user may also enter information about team or sport (or other activity) preferences so that the content engine 140 may provide information that is relevant to the user's interests.

As shown, processing of FIG. 4 begins at 402 where a user operating a mobile device 102 triggers a request for additional data or information by capturing an image of an event, location or activity (e.g., such as the user who captured an image of a football field as described above). In some embodiments, while the mobile application is running, any image captured by the mobile device may trigger a request for additional data or information.

The image data captured at 402 is appended with additional data at 404, including geolocation data and a time stamp. In some embodiments, perspective data (such as an angle of the mobile device when the image was captured) may also be appended to allow more accurate processing of the request. Pursuant to some embodiments, an image processing module or software component may be used to process the image captured (e.g., to identify layers, perspective, etc. for use in further processing by the mobile device 102 and/or the content engine 140 or other systems or devices).

Processing continues at 406 where the data is transmitted to the content engine 140 for further processing. For example, the data may be transmitted using the networks described in FIG. 1, above. The request may uniquely identify the mobile device 102 as well as the user, so that targeted and personalized information and preferences may be used in processing the request. The content engine 140 operates on the request to identify the location and event associated with the image, and identifies relevant data, images and other information to return to the mobile device 102. Processing continues at 408 where the mobile device 102 receives the meta data (or additional information, data or images) and displays the meta data on a display device of the mobile device 102. In some embodiments, once an image or initial request has been transmitted, a session is established in which the step of receiving and displaying meta data continues until the application is terminated or a new image or request is received. In this manner, embodiments allow users of mobile devices to receive accurate and relevant information about live events, locations or activities.

Further details of some embodiments of mobile devices that may be used in conjunction with embodiments of the present invention will now be described by reference to FIG. 5 where details of a mobile device 500 according to some embodiments is shown. As depicted, the mobile device 500 includes a number of components which may be controlled or perform functions in conjunction with one more application programs 510-512 to perform the features of some embodiments.

The mobile device 500 can include a memory interface 502 one or more data processors, image processors and/or central processing units 504, and a peripherals interface 506. The memory interface 502, the one or more processors 504 and/or the peripherals interface 506 can be separate components or can be integrated in one or more integrated circuits. The various components in the mobile device 500 can be coupled by one or more communication buses or signal lines.

Sensors, devices and subsystems can be coupled to the peripherals interface 506 to facilitate multiple functionalities. For example, one or more sensors, including biometrics sensors 514 and 528, an accelerometer 516, a photoelectric device 516, a proximity sensor 520, a camera 522, a wireless communication unit 524, and an audio unit 526 may be provided to facilitate the collection, use and interaction with data and information and to achieve the functions of the applications described herein.

The mobile device 500 may include one or more input/output (I/O) devices and/or sensor devices. For example, input controllers 534 may be provided with a speaker and a microphone (not shown) to facilitate voice-enabled functionalities, such as phone and voice mail functions. In some implementations, a loud speaker can be included to facilitate hands-free voice functionalities, such as speaker phone functions. An audio jack can also be included for use of headphones and/or a microphone.

The I/O subsystem 530 can include a touch screen controller 532 and/or other input controller(s) 534. The touch-screen controller 532 can be coupled to a touch screen 536. The touch screen 536 and touch screen controller 532 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 536.

The other input controller(s) 534 can be coupled to other input/control devices 538, such as one or more buttons, rocker switches, thumb-wheel, infrared port, USB port, and/or a pointer device such as a stylus. The one or more buttons (not shown) can include an up/down button for volume control of the speaker and/or the microphone. In some implementations, a proximity sensor 520 can be included to facilitate the detection of the user positioning the mobile device 500 proximate to the user's ear and, in response, to disengage the touch-screen display 536 to prevent accidental function invocations. In some implementations, the touch-screen display 536 can be turned off to conserve additional power when the mobile device 500 is proximate to the user's ear.

Other sensors can also be used. For example, in some implementations, a photoelectric device 518 may be provided to facilitate adjusting the brightness of the touch-screen display 538. In some implementations, an accelerometer 516 can be utilized to detect movement of the mobile device 500. In some embodiments, the mobile device 500 may include circuitry and sensors for supporting a location determining capability, such as that provided by the global positioning system (GPS) or other positioning system (e.g., systems using Wi-Fi access points, television signals, cellular grids, Uniform Resource Locators (URLs)). In some implementations, a positioning system (e.g., a GPS receiver) can be integrated into the mobile device 500 or provided as a separate device that can be coupled to the mobile device 500 through a peripherals interface 506 to provide access to location-based services. Data from the location or positioning system(s) may be transmitted to a remote entity such as content engine 140 (of FIG. 1) for analysis and to identify information associated with a location and an event or activity associated with that location. For example, data from the location or positioning system(s) may be transmitted with image data, timestamp data, or a user request in order to obtain information about an event occurring at a location of the mobile device, as well as to perform image processing or analysis of an image associated with a location.

The positioning and location-based services may be used, for example, to tag data transmitted from the mobile device 500 to content engine 140. For example, such location data may be appended to messages transmitted to content engine 140 associated with requests for additional information about an image, event, location or activity (e.g., such as the data submitted at 406 in FIG. 4, above). In this way, location based data may be used to enhance a user's viewing or enjoyment of a live event or activity (such as viewing a sporting event).

The mobile device 500 can also include a camera lens and sensor 520. In some implementations, the camera lens and sensor 520 can be located on the back surface of the mobile device 500. The camera can capture still images and/or video. The camera may be used, for example, to capture images of items, areas, people, locations or the like associated with an event or location. Images captured by the camera lens and sensor 520 may be appended with geolocation data (e.g., from the positioning system) as well as time and date information to allow the mobile application as well as the content engine 140 to identify data and information associated with the image.

The mobile device 500 can also include one or more wireless communication subsystems 524, such as an 802.11b/g communication device, and/or a Bluetooth® communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3 G (e.g., EV-DO, UMTS, HSDPA), etc.

In some implementations, additional sensors or subsystems may be coupled to the peripherals interface 506 via connectors such as, for example a Universal Serial Bus (USB) port, or a docking port, or some other wired port connection.

The memory interface 502 can be coupled to memory 508. The memory 508 can include high-speed random access memory and/or non-volatile memory, such as one or more magnetic disk storage devices, one or more optical storage devices, and/or flash memory (e.g., NAND, NOR). The memory 508 can store an operating system, such as Darwin, RTXC, LINUX, UNIX, OS X, WINDOWS, or an embedded operating system such as VxWorks. The operating system may include instructions for handling basic system services and for performing hardware dependent tasks. In some implementations, the operating system can be a kernel (e.g., UNIX kernel).

The memory 508 may also store application programs 510-512 which act, in conjunction with the processors 504, to cause the mobile device to operate to perform certain functions, including the mobile event and image processing related functions described herein. The memory 508 can also store data, including but not limited to documents, images, video files, audio files, and other data. In some implementations, the memory 508 stores address book data, which can include contact information (e.g., address, phone number, etc.) for one or more persons, organizations, services, or entities.

Once an application is launched, the user may interact with the application, and the mobile device may function pursuant to the program instructions associated with the application. For example, once the mobile application is launched, a user may perform the process of FIG. 4, described above Thus, embodiments of the present invention allow mobile device users to obtain additional information and data about an event, activity or location by simply and quickly capturing an image associated with the event, activity or location. The image may then be appended with additional information such as graphics, statistical data, or other data that helps improve the user experience of the event, activity or location. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A portable wireless communication device, comprising:
   a communication port;
   a processor;
   a memory;
   and a program, wherein the program is stored in the memory and configured to be executed by the processor, the program including:
      instructions for detecting a capture of an image;
      instructions for detecting a location and a time associated with said capture of said image;
      instructions for transmitting, to a processing system, a request for information associated with said image, said request including information identifying said location and said time associated with said capture of said image; and
      instructions for receiving a response from said processing system, said response including information associated with said image, said response information determined to be associated with said captured image based, at least, on said location and time associated with said captured image and information identified in said captured image by image processing of said captured image.

2. The portable wireless communication device of claim 1, wherein said information associated with said image includes at least one of: (i) an image overlay, (ii) statistical information, (iii) location information, and (iv) location data.

3. The portable wireless communication device of claim 2, wherein said image overlay includes at least one of (i) a first down line, (ii) a line of scrimmage, and (iii) a field marker.

4. The portable wireless communication device of claim 1, wherein said response from said processing system includes information identifying at least one of an event, an individual, and a location associated with said image.

5. The portable wireless communication device of claim 1, wherein said response from said processing system includes data defining a graphical overlay to display over said image, said data including said graphical overlay and a position of said graphical overlay.

6. The portable wireless communication device of claim 5, further comprising:
   instructions for displaying said graphical overlay in said position.

7. The portable wireless communication device of claim 1, wherein said response includes data identifying an event associated with said image, the device further comprising:
   instructions for requesting updated information associated with said event.

8. The portable wireless communication device of claim 7, wherein said instructions for requested updated information associated with said event are automatically executed until at least one of a completion of said event or detection of an input from said user.

9. The portable wireless communication device of claim 1, wherein said response includes data identifying an event associated with said image, the device further comprising:
   instructions for displaying a set of information options available to said user based on said event.

10. The portable wireless communication device of claim 9, wherein said information options available to said user include (i) event statistical data, (ii) event video data, (iii) location data associated with a location of said event, and (iv) related event data.

11. The portable wireless communication device of claim 1, wherein said response includes data identifying an event, wherein said event is a sporting event.

12. An event data system, comprising:
   a data storage device for storing data defining a plurality of locations and a plurality of events associated with each of said plurality of locations;
   a computer processor for executing program instructions and for retrieving said data defining a plurality of locations and a plurality of events from the data storage device;
   a memory, coupled to the computer processor, for storing program instructions for execution by the computer processor to:
      receive, from a mobile device associated with a user at one of said locations and one of said events, sensor data collected from at least a first sensor of said mobile device and associated with an image captured by said mobile device;
      determine, based at least in part on said sensor data, one of said locations;
      determine, based at least in part on said sensor data, one of said events; and
      transmit, to said mobile device, information associated with said captured image, said information determined to be associated with said captured image based, at least, on said determined location and said determined event and information identified in said captured image by image processing of said captured image.

13. The event data system of claim 12, wherein said sensor data includes location data.

14. The event data system of claim 13, wherein said program instructions for execution by the computer processor to determine one of said locations and one of said events includes program instructions to identify one of said locations based on said location data.

15. The event data system of claim 14, wherein said program instructions for execution by the computer processor to determine of said events includes program instructions to determine one of said events based on said identified one of said locations and time stamp data received from said mobile device.

16. The event data system of claim 12, wherein said information associated with said image includes data identifying an image overlay for display by said mobile device.

17. The event data system of claim 12, wherein said information associated with said image includes data identifying statistical information associated with said event.

18. The event data system of claim 12, wherein said information associated with said image includes data identifying statistical information associated with said event at a point in time when said image was captured by said mobile device.

* * * * *